E. W. FOTHERGILL.
VEHICLE WHEEL.
APPLICATION FILED AUG. 7, 1913.
1,176,671.
Patented Mar. 21, 1916.
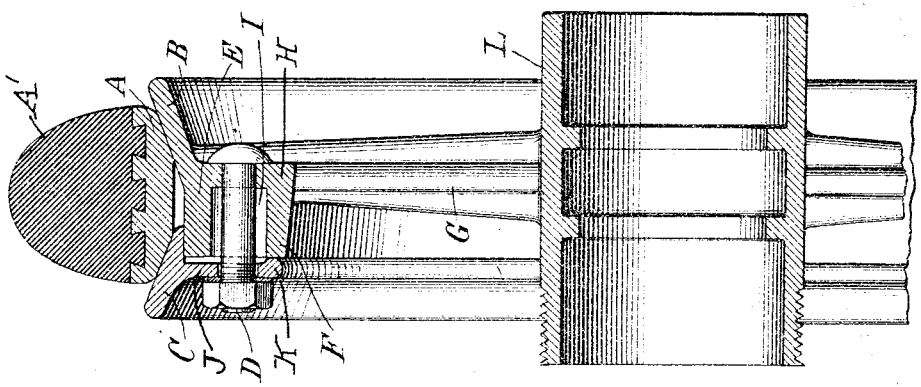
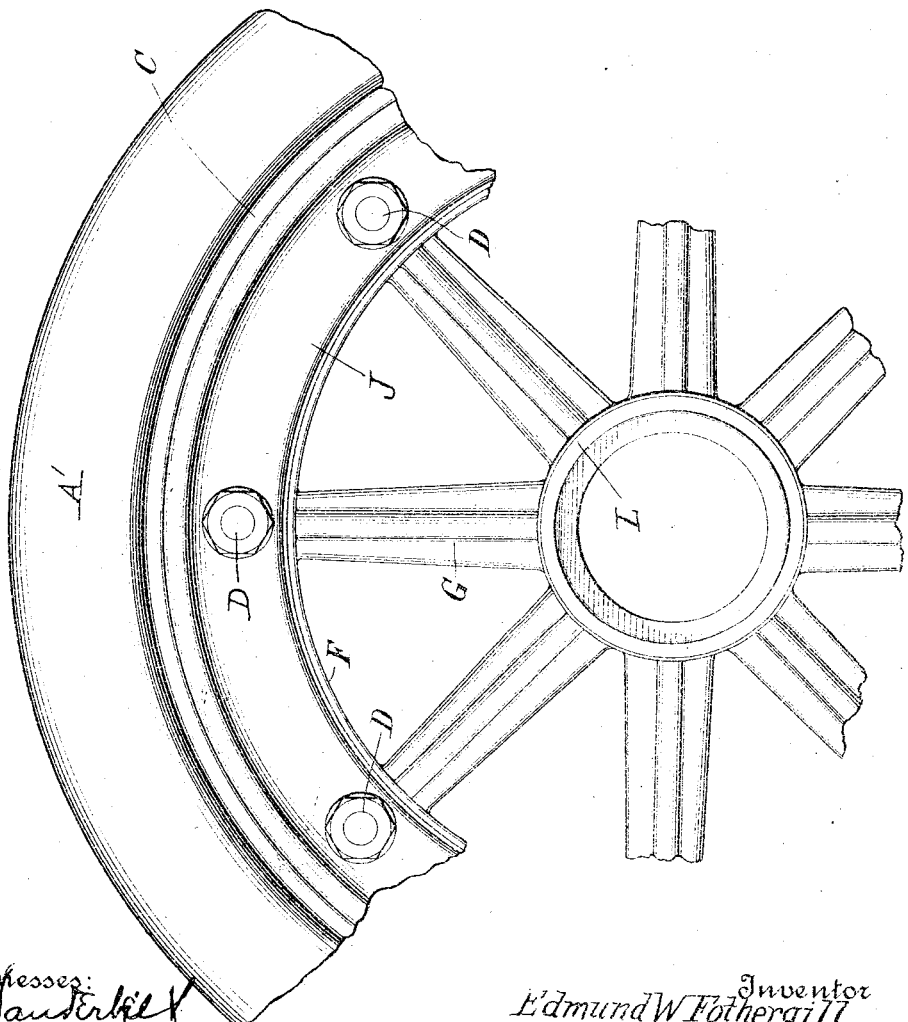
Witnesses:
J. B. Vanderbilt
Bernard Dean
Inventor
Edmund W. Fothergill.
By his Attorney
Ernest Hopkinson

UNITED STATES PATENT OFFICE.

EDMUND W. FOTHERGILL, OF HARTFORD, CONNECTICUT, ASSIGNOR TO HARTFORD RUBBER WORKS COMPANY, OF HARTFORD, CONNECTICUT, A CORPORATION OF CONNECTICUT.

VEHICLE-WHEEL.

1,176,671. Specification of Letters Patent. Patented Mar. 21, 1916.

Application filed August 7, 1913. Serial No. 783,472.

*To all whom it may concern:*

Be it known that I, EDMUND W. FOTHERGILL, a citizen of the United States, residing at Hartford, county of Hartford, and State of Connecticut, have invented certain new and useful Improvements in Vehicle-Wheels, of which the following is a full, clear, and exact disclosure.

My invention relates to vehicle wheels that are particularly used in connection with motor vehicles and is especially adapted for use in connection with solid tires, although I do not wish to be understood as limiting the use of my invention to such tires.

The object of my invention is to produce a wheel for vehicle tires that is not only lighter than those heretofore used with heavy vehicles such as motor trucks but one which may be more readily assembled and disassembled in case it becomes necessary to change the tire.

Other advantages of my improved construction will be apparent from a fuller description of the invention.

For a detailed description of one form of my invention reference may be had to the following specification and the accompanying drawings forming a part thereof, in which—

Figure 1 is a side elevation of a portion of the wheel having my improved rim applied thereto and Fig. 2 is a vertical sectional view of that portion of wheel shown in Fig. 1.

Referring to the drawing, the letter A indicates a continuous metallic base ring or band upon which the elastic tire A' is rigidly fixed. This base band A has inclined edges as indicated in Fig. 2. The main or felly portion of the wheel comprises a cylindrical part E from one side of which extends a flange B providing a surface which is inclined relative to the axis of the wheel. From the part E there extends inwardly a central web H to which the spokes G are attached and, in this instance, made integral therewith. Extending laterally from the web H is a cylindrical flange F which forms with the cylindrical part E an annular groove I. The parts E, F, and H constitute the felly of the wheel.

The letter C indicates a split ring having an inclined outer surface and a substantially cylindrical inner surface where it comes in contact with the cylindrical part E of the rim. The inner portion of the ring C is provided with a radially extending web or flange J which terminates in the rounded bead K. Fastening bolts D or similar devices pass through the web J and through the web H extending from the main portion of the rim. When the parts are in position as indicated in Fig. 2 the bead K rests upon the outer edge of the flange F through which a fulcrum is formed so that when bolts D are tightened the inclined portion C of the split ring will be forced toward the center of the rim to wedge the base band A firmly in position, in connection with the inclined surface on the flange B.

In this form of my invention all the parts of the rim except the split wedging ring C and including the hub L are preferably made integral and of cast metal.

By reason of the fact that no separate felly is required and also because the main portion of the rim is provided with a groove, the weight is much reduced while at the same time great strength is maintained. The construction described also reduces the number of movable parts to the smallest number and eliminates a separable flange at one side of the rim. The construction also permits the use of shorter bolts and by reason of the compact nature of the rim no cumbersome appearance is obtained, the structure having a neat and pleasing appearance both as to symmetry and outline.

It is seen that all that is necessary to do when the tire is removed or placed in position is a manipulation of the bolts so that the split ring C may be placed in position or removed.

Having thus described this form of my invention what I claim and desire to protect by Letters Patent is:

A vehicle wheel for demountable tires, comprising, two rim members adapted to telescope with each other, each of said members having integral inclined outer portions adapted to engage the tire base, one of said members having a central integral base portion provided with a recess in one side thereof, the other of said members having a radial flange covering said recess, and fastening devices entering said recess and engaging said flange and base portion to force said members together.

Signed at the city of Hartford, county of Hartford and State of Connecticut, this 5th day of August, 1913.

EDMUND W. FOTHERGILL.

Witnesses:
   GEO. W. BURNEY,
   P. F. JENNINGS.